United States Patent [19]

Heine et al.

[11] 4,082,946

[45] Apr. 4, 1978

[54] APPARATUS FOR CONTROLLING THE ILLUMINATION OF OPTICAL EXAMINATION DEVICES

[75] Inventors: Helmut A. Heine; Otto H. Schmidt, both of Herrsching; Helmut W. Rosenbusch, Weilheim, all of Germany

[73] Assignee: Propper Manufacturing Co., Inc., Long Island City, N.Y.

[21] Appl. No.: 703,573

[22] Filed: Jul. 8, 1976

[51] Int. Cl.² .......................... F21L 1/00; F21L 25/00
[52] U.S. Cl. .......................................... 362/32; 128/6; 350/96.26
[58] Field of Search ................ 240/1 EL, 1 LP, 2.18, 240/6.46, 10 T, 92, DIG. 8; 350/96 B; 128/6, 11, 16, 18, 22, 23

[56] References Cited
U.S. PATENT DOCUMENTS

| | | | |
|---|---|---|---|
| 3,431,410 | 3/1969 | Dolan et al. | 240/10 L X |
| 3,536,908 | 10/1970 | Oster | 240/10 L UX |
| 3,758,951 | 9/1973 | Scrivo et al. | 240/1 LP X |
| 3,775,606 | 11/1973 | Bazell et al. | 240/1 LP X |
| 3,805,048 | 4/1974 | Brennesholtz | 240/1 EL X |
| 3,831,017 | 8/1974 | Auer | 240/1 LP X |

*Primary Examiner*—Richard A. Wintercorn
*Attorney, Agent, or Firm*—Amster & Rothstein

[57] ABSTRACT

An apparatus for controlling the illumination of optical examination devices adapted to be connected to the distal end of a light conducting cable connected at its near end to a source of light, which apparatus permits control of illumination of the distal end of the cable. The apparatus includes a housing connected to the distal end of the cable and adapted to receive optical examination devices. A filter support mounts a plurality of filters within the housing for selective movement in and out of the path of light eminating from the distal end of the cable. The filter support is moved by operating a positioning control on the housing which is mechanically coupled to the filter support. In operation, the optical examination device is mounted to the housing which serves as a handle for it, and the illumination of the device is selected by operating the positioning control with the same hand that holds the housing.

5 Claims, 3 Drawing Figures

APPARATUS FOR CONTROLLING THE ILLUMINATION OF OPTICAL EXAMINATION DEVICES

The invention concerns an apparatus for controlling the illumination of optical examination devices adapted to be connected to the distal end of a light conducting cable connected at its near end to a source of light.

In optical examinations, for example in endoscopy, otoscopy, or ophthalmoscopy, it is generally indispensible to adapt the illumination to prevailing requirements. With ophthalmoscopy, for example, it is customary to select the color of the light in such a way that certain peculiarities of the field under investigation emerge more clearly, while others by contrast disappear entirely or almost entirely.

From the German Utility Pat. No. 1,987,243, an apparatus is known which serves to control the illumination, and specifically the color of the light. In this apparatus, an eccentrically mounted disk is arranged in the light path of the lamp of a projector. Various color filters are distributed along the circumference of the disk. A desired color filter can be switched into the light path by turning the disk.

From the same German Utility patent, it is furthermore known that a coupling member can be included in the light conducting cable of a so-called cold light projector, in order to avoid certain disadvantages of the apparatus described above. The coupling member has a slide arranged inside it, and the slide carries various filters. The cold light projector is a projector to which one or more light conducting cables are connected.

Both known apparatuses have the common disadvantage that they are relatively far removed from the site of actual use. Consequently, either the examination device must be put down before the illumination is changed, or the free hand of the investigator must be used to change the illumination. But such a procedure makes severe demands on the attention of the investigator, quite apart from the fact that under some circumstances the examination field must be found all over again after the illumination is adjusted. As a consequence, there are undesirable losses of time, if not even mistakes in the examination.

With a control apparatus designed as a slide in a coupling member, not only is the handling inconvenient and difficult, but moreover dust can penetrate and stray light can emerge along the guides of the slide. The latter effect interferes with examinations that must be carried out in darkness.

The invention is based on the task of creating an apparatus to control the illumination of optical examination devices. This apparatus can be operated simply and conveniently with the hand that holds the examination device.

The task is solved according to the invention by housing the filter disk in the handle of the examination device (which may be self sufficient or which may be directly connected to a cold light projector), or by housing the filter disk in a universal grip that is arranged at the far end of the light conducting cable or a cold light projector. Various supplements for carrying out the examination can be inserted into such a universal hand grip. The filter disk can be operated from the outside either directly or by means of suitable transfer elements.

According to the invention, the filter disk is arranged in the handle of the examination device or in the universal hand grip of the light conducting cable of a cold light projector into which the actual examination device can be inserted. Consequently, the control apparatus can be operated with the hand that holds the device, without the device having to be put down for this purpose. As a consequence, the examination can be performed much more quickly and much more accurately, because the investigator need pay no attention to the operation of the device.

The filter disk is preferably enclosed by a positioning ring which is mounted eccentrically to it. At the outer circumference of the filter disk grooves are provided, and at the inner circumference of the positioning ring teeth are provided which mesh with the grooves. The hand grip is cylindrical and the positioning ring is mounted coaxially with respect to the hand grip.

When this embodiment of the invention is used with a universal hand grip, the examination aids that are intended to be inserted into the grip need not be positioned in any particular way. Furthermore, particularly convenient operation is achieved without having to hold the hand grip in a particular position or in a particular hand. This is an especially important advantage of the control apparatus according to the invention, because, e.g., in ophthalmoscopy, the device must be held in either the right hand or left hand of the physician, depending on which of the patient's eyes is being examined. In this case, the device should be capable of being operated equally conveniently and reliably when held in either hand. Furthermore, with this construction, gaps which run in a labyrinthine fashion prevent undesirable stray light from penetrating to the outside and prevent dust from penetrating to the inside.

The positioning ring is preferably arranged at the upper end of the hand grip. In this position, it is conveniently activated with a finger, generally with the thumb, of the hand that holds the grip. At the same time, the position of the device in the hand need not be changed. Furthermore, in this position it lies in the immediate vicinity of the remaining positioning and control devices of the examination device or of the examination supplements, so that these are also easily reached, without the assistance of the other hand and without having to put down the device or change its position.

In order to be able to switch the filter disk into a precisely defined position, a detent ball is preferably provided. This detent ball is tensioned, by means of a spring, in the direction of the circumference of the filter disk.

Furthermore, a pin is rigidly affixed, preferably on the housing, which pin meshes with a notch arranged on the positioning ring. The notch has the shape of a circular arc. In this way, direct switching between certain neighboring filter positions is prevented, for example between the most strongly absorbing filter and the empty position in which no filter is inserted into the light path.

One or more color filters are preferably provided in the filter disk.

As an alternative or as an addition, one or more grey filters can be provided in the filter disk. The grey filter can consist of a grey wedge, which is suitably shaped like a circular ring, and which is moveable and/or rotatable perpendicular to the light path. Alternatively, several openings can be arranged in the filter disk. Each one of these can accept one filter (a color filter or a grey filter). Here, the opening corresponding to the empty position of the filter disk suitably has a larger diameter than the openings intended to accept the grey filters.

Utilization of one or more grey filters and/or of a grey wedge, that is for example of an evenly colored grey filter with variable strength, has the advantage that it is possible to control the light intensity independent of the color temperature. This advantage is in contrast to known control devices, in which the illumination intensity is controlled with the aid of the voltage applied to the lamp of the examination device or of the projector. When one or more grey filters are used, the spectral radiation distribution of the light source remains specifically intact, so that the details of the examination field appear unchanged in their natural color when white light is used and appear unchanged in the same color when colored light is used, as when they are inspected under full illumination intensity.

The use, according to the invention, of one or more grey filters to control the intensity of a radiation source is furthermore even of advantage with respect to the control apparatus known from the German Utility Pat. No. 1,967,799. The reason for this advantage is that with the latter control apparatus, even apart from its likewise less favorable operability, the light intensity is variable by means of a slit arranged in a slide. This slit has a cross section that is variable in the direction of the slide. Consequently, when the slide is moved, the effective light transmission cross section (not the light intensity) is changed, so that, depending on the position of the slide, a larger or smaller quantity of light is transmitted to the far end of the light conducting cable and to the examination field. With this control apparatus, the problem of different color temperature with voltage controlled light sources is indeed avoided, but only the total light flux is influenced, without respect to its distribution over the cross section. The result is an inhomogeneous distribution of light density in the examination field. This result precludes application of this apparatus to many instruments in which a homogeneous light field is a compelling requirement, e.g., ophthalmoscopes. The design of the apparatus in the form of a slide has the further disadvantage that light always emerges along the slide, even with good lateral sealing. In this way, stray light results, which is undesireable for many investigations. All these disadvantages are avoided with the apparatus according to the invention.

Under appropriate circumstances, diaphragms or test marks can also be inserted into the openings of the filter disk, as alternatives or as additions to the color filters and/or grey filters. It is also conceivable that several positioning rings and several disks mounted eccentrically to them can be provided axially one after the other on one hand grip.

The foregoing brief description as well as further objects, features and advantages of the present invention will best be understood by reading the following detailed description of a presently preferred, but nonetheless illustrative, embodiment of the present invention and referring to the drawing in which.

Figure 1:
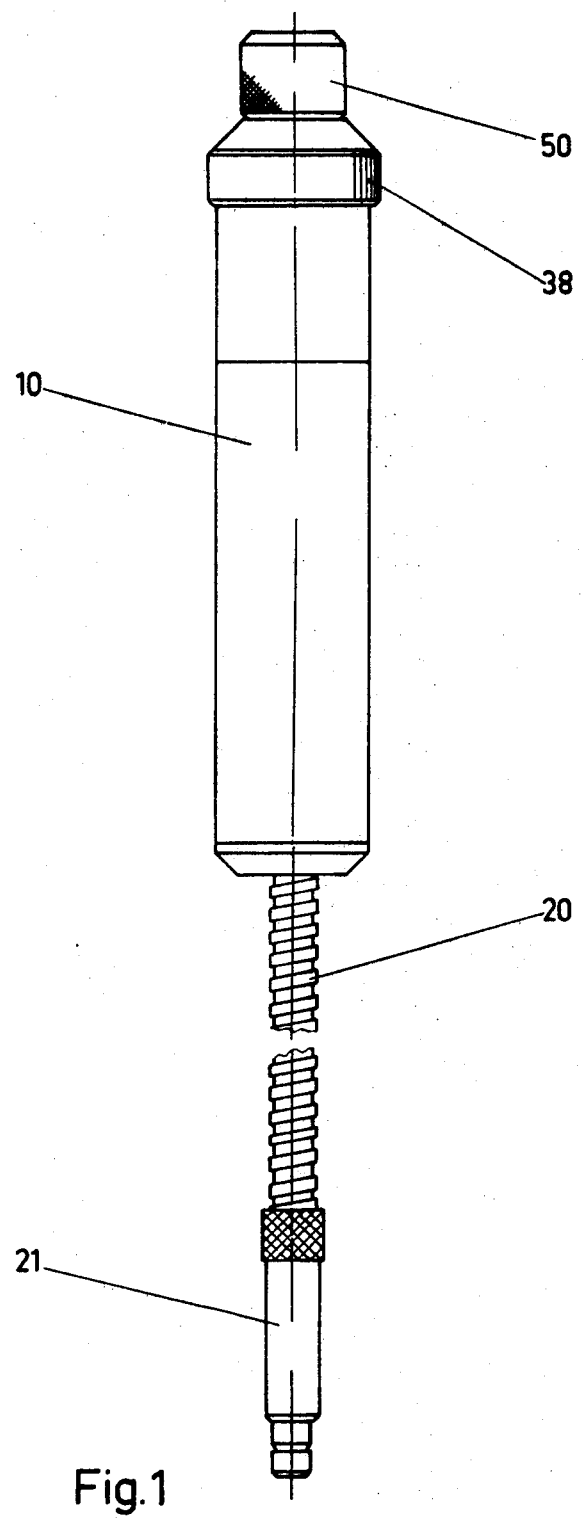
FIG. 1 shows the universal hand grip of a cold light projector having a light conducting cable with a plug arranged at its proximal end.

FIG. 1 shows a universal hand grip 10 with a head 50. The optical examination device to be used at a particular time is inserted into head 50. It can be secured in head 50, for example by means of a bayonet lock. At the opposite end of the universal hand grip 10, a light conducting cable 20 is introduced into the universal hand grip 10. The other end of the light conducting cable 20 is provided with a plug 21. The plug 21 can be inserted into an appropriate socket of a cold light projector (not shown). A positioning ring 38 serves to switch in the grey filter desired at a particular time.

Figure 2:
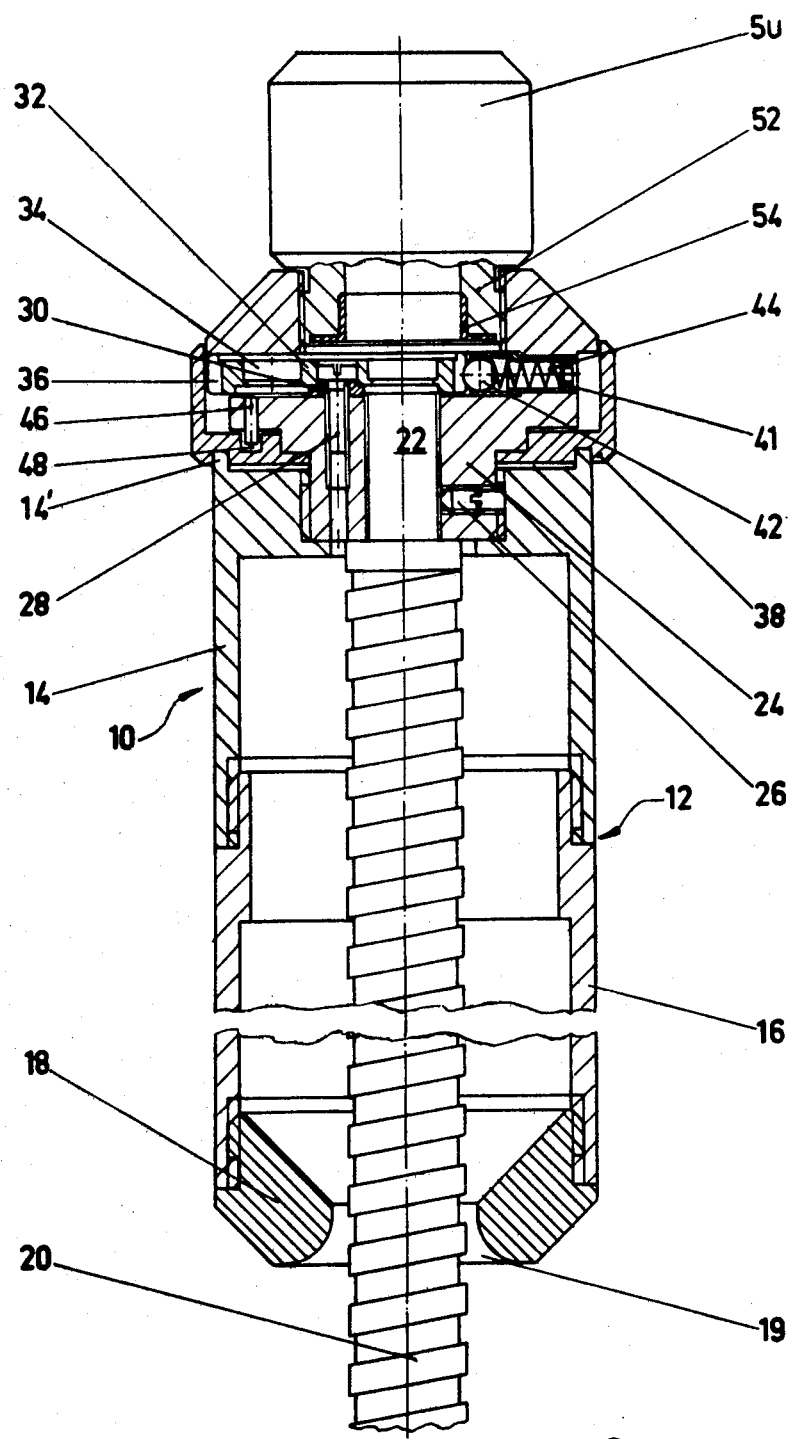
FIG. 2 shows the cross section of the universal hand grip.

FIG. 2 shows the details of the universal hand grip 10. The universal hand grip 10 includes a tubular housing 12. The housing 12 is constructed of one or more parts, and here it is composed of two mutually connected parts 14 and 16. The part 14 preferably consists of steel; the part 16 preferably consists of synthetic or aluminum. At the end of part 16 which is opposite to the screw threads, is affixed a sealing ring 18, through whose opening 19 is introduced the light conducting cable 20. At the end of part 14 opposite to the screw threads, is situated a screwed-on holding ring 24. The fiber bundle 22 of the light conducting cable 20 is introduced into the central hold of holding ring 24. The fiber bundle 22 is freed of its outer protective jacket and is surrounded by a protective casing (not shown). It is secured by means of a stud screw 26.

A threaded boring is located in holding ring 24 next to the central boring. An axis screw 28 is screwed into this threaded boring. The head of this axis screw is kept at a certain distance from the surface of the holding ring 24 by means of a distancing ring 30. A filter disk 32 is mounted on the axis screw and the distancing ring. Several openings 34 (see also FIG. 3) are provided in the filter disk 32 along a circular line whose radius is equal to the axis distance of the axis screw 28 and the central boring of the holding ring 24. In this way, one of the openings 34, into each of which a grey filter with a certain absorption capacity is inserted, can always be brought into coincidence with the central boring of the holding ring 24 and thus with the fiber bundle 22.

Figure 3:
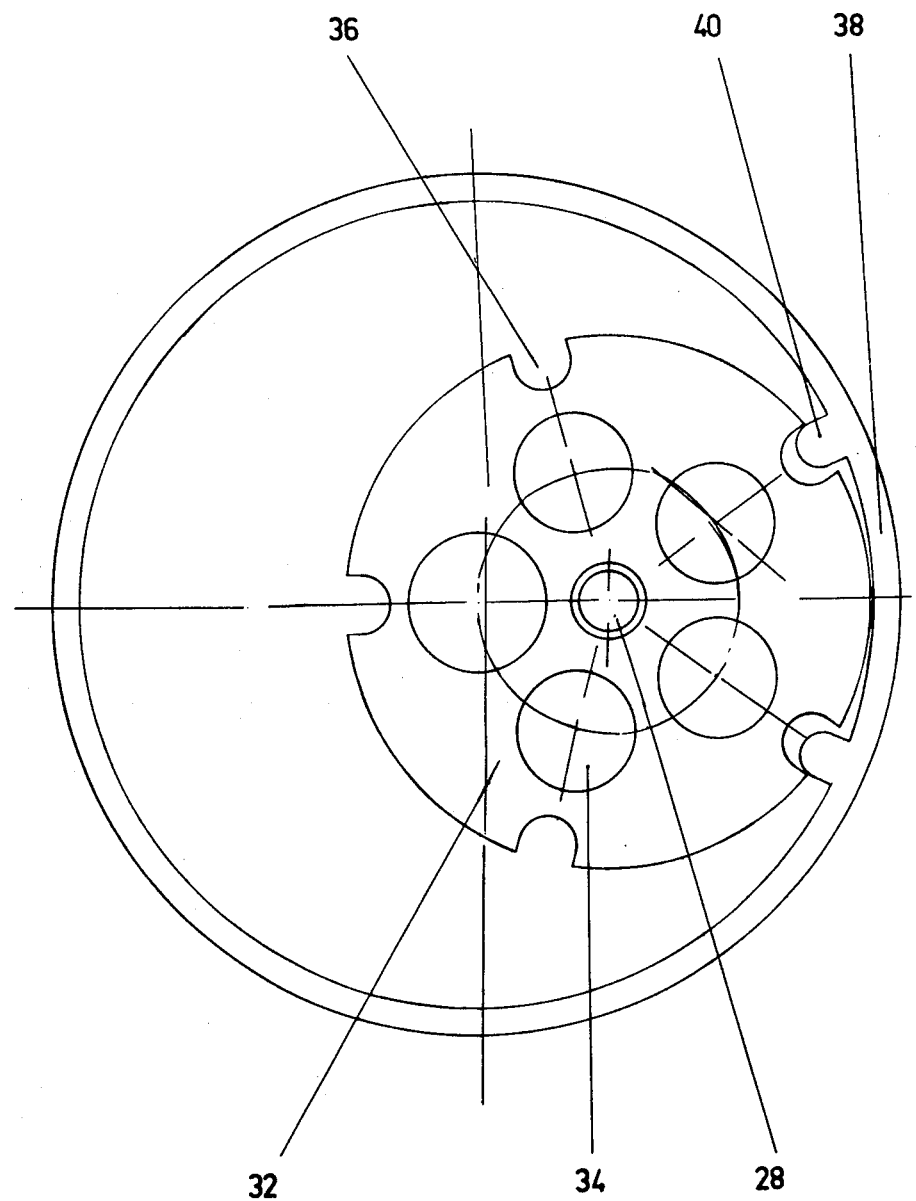
FIG. 3 shows the top view of the filter disk and the positioning ring.

As already mentioned, grey filters (not shown) with different absorption capacities are inserted into the openings 34 of the filter disk 32. The opening 34 which in FIG. 3 is situated in the central position, has a larger diameter than the remaining openings. This opening represents the so-called empty position, i.e., it does not contain a grey filter. The diameter of this opening is chosen larger so that a condensor lens can be inserted in it if circumstances so require. Such a condensor lens makes it possible to bundle the light emerging at a certain aperture angle from fiber bundle 22, so that light losses can be kept at a minimum.

According to FIGS. 2 and 3, the filter disk 32 is enclosed by the position ring 38. The position ring 38 is mounted coaxially to the fiber bundle 22. Teeth 40 are affixed to the interior circumference of positioning ring 38. These mesh with notches 36 that are formed at the outer circumference of the filter disk 32. With this construction, the filter disk 32 can conveniently be moved with the aid of the positioning ring 38, without the universal hand grip 10 having to be held in a special position in the hand. It likewise does not matter whether the universal hand grip 10 is held in the left hand or the right hand. This construction has the further advantage that the positioning ring 38 and the parts bordering on it can be shaped in such a manner that stray light is positively precluded from emerging to the outside. Such stray light would interfere with work in darkened rooms. In the embodiment shown, the mutually abutting surfaces of the holding ring 24 and of the positioning ring 38 are designed in steps. The positioning ring 38 furthermore overlaps the upper end of the cylindrical part of the holding ring 24. Holding ring 24 subsequently runs out into a truncated cone. In this fashion the interior space enclosed by positioning ring 38 is sealed light tight.

The positioning ring 38 is mounted on a circularly shaped protrusion 14' on part 14 of the universal hand grip 10 by means of a likewise circularly shaped notch provided in positioning ring 38.

When the filter disk 32 is set in defined positions, one of the openings 34 is in coincidence with the central boring of holding ring 24 and thus with the fiber bundle 22. In order to be able to set filter disk 32 in such defined positions, a sleeve 41 is inserted into the holding ring 24. A detent ball 42 can be moved back and forth in this sleeve. The detent ball 42 is pretensioned by a screw spring 44 in the direction of the circumference of the filter disk 32. In the defined position, the detent ball 42 always meshes with a notch 36 on the outer circumference of the filter disk 32.

Furthermore, a pin 46 is fastened in the holding ring 24. This pin 46 engages a notch 48 which is circular in shape and which is designed into positioning ring 38. The beginning and end of this notch lie between the opening 34 of the filter disk 32 which represents the empty position, and the opening of filter disk 32 which contains the strongest grey filter. In the representation of FIG. 3, for example, this means between the opening situated in the central position and one of the neighboring openings.

At the upper end of the holding ring 24 is provided a threaded boring which lies coaxially to the fiber bundle 22. A threaded piece 52 of a head 50 is screwed into this threaded boring. At the foot of the threaded piece 52 is located a gauge ring 54. The gauge ring 54 is coaxial to the threaded piece 52.

The foot of an examination device, for example an ophthalmoscope, can be inserted into the head 50 and can be secured, e.g., by means of a bayonet lock. The foot of the examination device reaches as far as the gauge ring 54 and is precisely centered with the aid of the latter. A fiber bundle or a light conducting rod extends from the foot of the examination device up to the immediate vicinity of the upper edge of the filter disk 32.

Although a specific embodiment of the invention has been disclosed for illustrative purposes, it will be appreciated by one skilled in the art that various modifications, additions, and substitutions are possible without departing from the scope and spirit of the invention.

What is claimed is:

1. An apparatus for controlling the illumination of optical examination devices adapted to be coupled to a source of light through a light conducting cable connected at its near end to said source of light, said apparatus comprising:
    a housing coupled to said light conducting cable at the distal end thereof;
    a plurality of filters; and
    means within said housing for mounting said filters for selective movement into and out of the path of light eminating from the distal end of said light conducting cable; positioning means mounted to said housing for movement relative thereto; and
    means for coupling the movement of said positioning means to said filter mounting means so that said filters can be moved in and out of said light path by moving said positioning means.

2. An apparatus according to claim 1 wherein said mounting means is a disc mounted for rotation about a first axis which is eccentric with respect to said light path, said disc including means about its circumference adapted to retain said filters, said filters being moved in and out of said path of light by rotating said disc.

3. The apparatus of claim 2 wherein said positioning means is a ring mounted for rotation about a second axis not aligned with said first axis, said coupling means comprising:
    a plurality of teeth spaced along the inner circumference of said positioning ring; and
    means on the circumference of said filter disc for meshing with said teeth, so that the rotation of said positioning ring is transmitted to said filter disc.

4. An apparatus in accordance with claim 3 wherein said housing is cylindrical and serves as a hand grip, said positioning ring being mounted coaxially with respect thereto.

5. The apparatus of claim 4 further comprising detent means for stopping the rotation of said filter disc in a plurality of predetermined positions, in each of which positions a different one of said filters is aligned in said light path.

* * * * *

UNITED STATES PATENT AND TRADEMARK OFFICE
CERTIFICATE OF CORRECTION

PATENT NO. : 4,082,946

DATED : April 4, 1978

INVENTOR(S) : Helmut A. Heine; Otto H. Schmidt; Helmut W. Rosenbusch

It is certified that error appears in the above-identified patent and that said Letters Patent are hereby corrected as shown below:

The assignee listed on the face of the patent should be as follows:

"Propper Manufacturing Co., Inc., Long Island City, New York; Optotechnik Heine KG, Herrsching, Germany"

*Signed and Sealed this*

*Third* Day of *October 1978*

[SEAL]

*Attest:*

RUTH C. MASON
*Attesting Officer*

DONALD W. BANNER
*Commissioner of Patents and Trademarks*